Patented Mar. 7, 1939

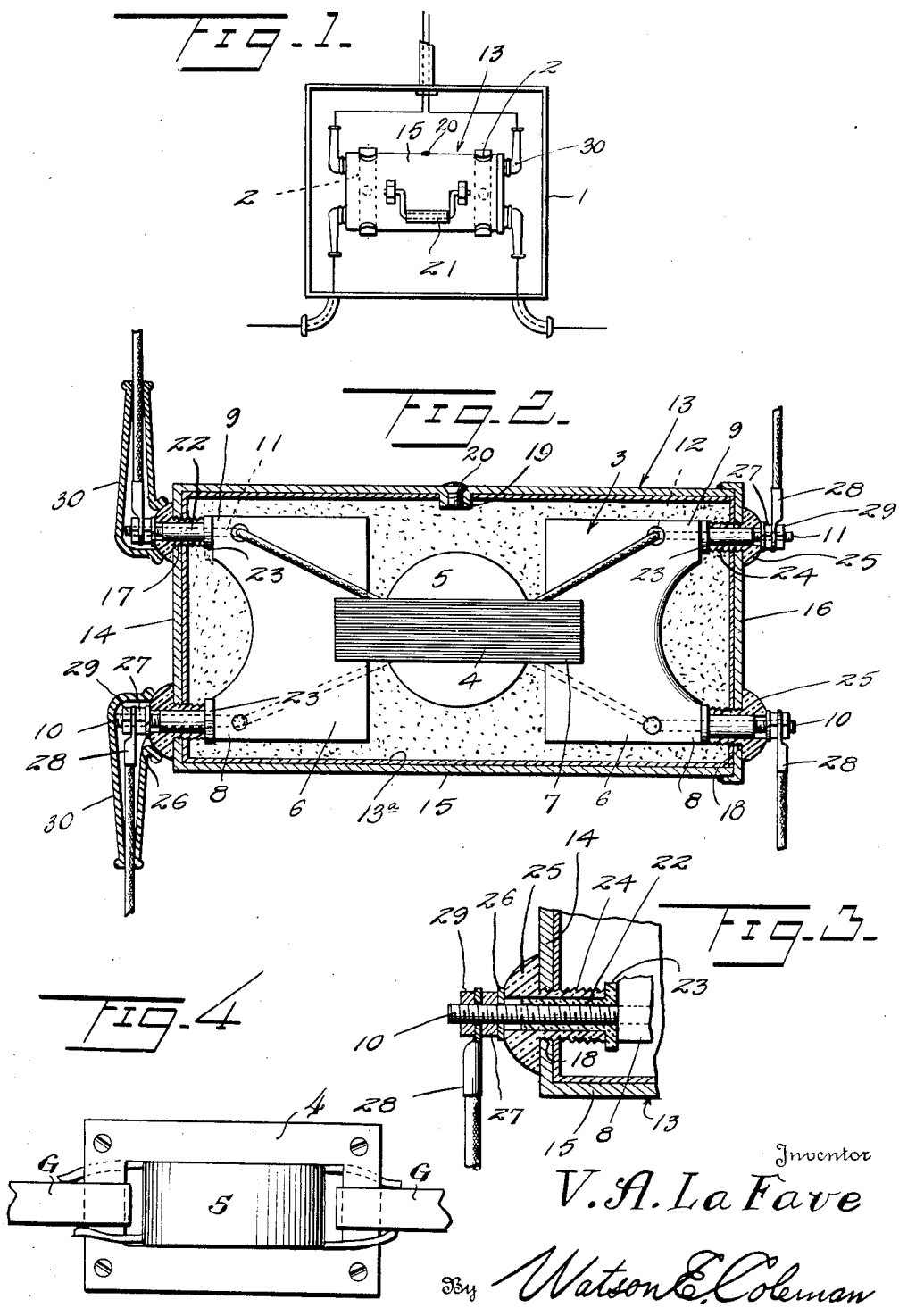

2,149,529

UNITED STATES PATENT OFFICE 2,149,529

TRANSFORMER UNIT

Victor A. La Fave, Rantoul, Ill.

Application July 21, 1936, Serial No. 91,778

4 Claims. (Cl. 175—361)

This invention relates to improvements in transformer coil installation and pertains particularly to an improved coil and method of housing the same.

In large scale lighting systems such as are used in connection with the illumination of athletic fields or airport landing fields, transformer units are employed in association with the light structures and the present practice is to house these transformers with the lead in and lead out wire connections in some type of receptacle which is filled with a moistureproof insulating substance and this receptacle is then buried in the ground at the base of the light fixture pole or standard. This method of housing and shielding the transformer units is open to serious objection because of the fact that the coil cannot be reached for testing without having to dig it up from the ground and it is then necessary to remove the insulation material from the receptacle around the ends of the connected leads. This system is also objectionable in that temperature changes cause expansion and contraction of the insulation material so that openings or cracks are formed into which moisture gathers causing the shorting of the system and this then requires that the transformer unit and its housing be dug out of the ground for repair or replacement. In addition to the foregoing, aside from the fact that considerable labor and time are necessary to get at the coil in order to apply test instruments, the danger exists of damaging an otherwise good coil or damaging the wire leads, in digging the same out of the ground.

The present invention has for its primary object to generally improve the present system of installing transformer coils in locations such as those above referred to, by providing an improved transformer unit and housing therefor, by means of which the unit may be thoroughly and completely insulated so that it may be mounted in a convenient housing placed either below the surface of the ground, on the ground or upon the standard or pole for the lighting fixture.

Another object of the invention is to provide an improved transformer unit and method of mounting the same in a housing and insulating it against current leakage and against entrance of moisture and in addition providing novel means whereby the primary and secondary terminals of the transformer are readily accessible to a mechanic for testing the coils of the device.

A still further object of the invention is to provide a novel insulating bushing unit for a current carrying post or lead whereby the same may be extended through a metallic wall and effectively electrically shielded so that a current leakage cannot occur from the terminal into the adjacent wall.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

Figure 1 is a view in elevation looking into the open front of a housing for the transformer unit embodying the present invention, showing the manner in which the unit is mounted in the housing;

Figure 2 is a vertical longitudinal section through the unit;

Figure 3 is a sectional view upon an enlarged scale through the improved coupling between the transformer and a wall of the unit shell.

Figure 4 is a view in side elevation of the transformer per se with portions of the end supporting members shown connected therewith.

Referring now more particularly to the drawing wherein like numerals of reference indicate corresponding parts throughout the several views, the numeral 1 generally designates a suitable housing within which the structure embodying the present invention may be mounted. This housing may be placed upon the surface of the ground, upon the light pole or standard in association with which the unit is used, or beneath the ground, as may be found most convenient, and the unit hereinafter described is designed to be firmly secured within the housing and easily and quickly removed therefrom when necessary, through the provision upon an inner wall of the housing of spring clips of the type indicated by the numeral 2. These clips are of the same character as those commonly used for supporting cylindrical fuses.

The numeral 3 generally designates an improved type of transformer coil or unit for mounting in the hereinafter described casing or shell which is secured in the housing 1 by the clips 2 and which contains a suitable insulating material of the so-called dry type. This transformer unit shown is the core type, the core being indicated at 4 and having mounted thereon in the usual manner the primary and secondary coils which are designated generally by the numeral 5. The core 4 is shown as being made up of a plurality of metallic plates or laminations and at each of two opposite ends it is coupled with a plate 6 of suitable insulation material such as slate, fibre, rubber or the like. Each of these insulation plates 6 is provided with a recess 7 across one edge in which the edge of the core 4 is held by being forced thereinto, thus effecting the compression of the core laminations together and each plate is formed to provide the two horns 8 and 9 from which the threaded terminal posts 10 and 11 extend. As illustrated, the pair of terminal posts 11 are smaller than the posts 10. These terminal posts 11 constitute the secondary posts or connections with the secondary coil of the transformer while the heavy posts 10 constitute the primary terminals. As illustrated, each insulation plate 6 is provided with a pair of openings 12 to receive the wires from the adjacent ends of the primary and secondary coils, these wires being extended into the apertures and soldered to their respective terminals, and the apertures are then filled or closed with a suitable sealing substance.

The numeral 13 generally designates a shell in which the transformer coil is housed. This shell is in the form of a metallic casing which is closed at one end by a head 16, the wall and opposite end of the shell being designated respectively by the numerals 15 and 14. Each of the end walls 14 and 16 of the shell has two apertures formed therethrough which are indicated by the numerals 17 and 18. As shown, the apertures 17 are smaller than the apertures 18 so that these apertures will substantially conform in size with the heavy and light terminal posts 10 and 11 of the transformer. Each of the apertures 17 and 18 is threaded. In addition to the end wall apertures the wall 15 of the casing or shell is provided with a threaded filling opening 19 which is adapted to be closed by a screw plug 20 provided with a suitable slot or kerf in which a screw driver may be engaged and through this opening the selected insulation material is forced after the coil has been mounted in the shell. The wall 15 of the shell is also provided with a suitable handle 21 by which it may be carried and by which the shell can be conveniently withdrawn from the housing 1.

The interior surface of the casing or shell is covered with a liner 13ª of wax paper, oil silk or a similar suitable material. This liner covers the entire inner surface of the wall 15 and the wall 14 and the cover 16 has its inner surface covered with the same material so that when it is placed over the end of the shell the entire interior surface of the shell will have this liner thereover. The liner is provided with openings corresponding with the openings 17 and 18 in the end walls.

In assembling the unit each of the four terminals of the transformer has placed thereon a rubber insulating sleeve 22 which snugly engages the terminal and which has an integral collar 23 which positions against the insulation plate horn at the inner end of the terminal. The transformer 3 is then disposed in the shell with the two terminal posts 10 and 11 at one end thereof extended through the apertures 18 and 17 of the bottom wall 14. The head or cover 16 is then placed over the end of the shell so that the other two terminals will extend through the apertures of the cover and the cover is then sealed to the body of the shell by welding or by any other suitable means. The insulating sleeves of the terminals will also be extended through the openings in the end walls of the shell.

There is then slipped over each terminal an exteriorly threaded insulation collar 24 which encircles the rubber insulator 22 and threadably engages in the opening in the wall through which the supporting terminal passes. Each of these collars, which is preferably formed of porcelain, glass, or some similar insulation substance, has a relatively large flat mushroom-like head 25 which, when the collar is threaded into the opening, is brought into firm contact with the outer side of the adjacent casing wall. By the use of these insulation collars at the two ends of the coil, the latter will be firmly suspended within the casing.

When the unit is in working position the large terminals 10 will be at the bottom or lower side of the shell and this will dispose the plates of insulation vertically therein so that the transformer coil and its core will be suspended between the plates in the central part of the shell. After the transformer has been mounted in the shell and the latter closed in the manner described, a suitable insulating compound is introduced through the opening 19 until the entire interior of the shell is filled whereupon the plug 20 will be inserted and the transformer will then be effectively encased and shielded against the entrance of moisture and against the loss of electric current.

Each of the terminal posts has a washer 26 placed thereabout which bears against the head 25 of the insulating collar 24 and there is then placed on the post the securing nut 27 which bears against the washer. The wire lugs 28 are then placed on the post and on these are placed the usual securing nuts 29. Each of the wire terminal lugs is covered, preferably, by a rubber shielding boot 30 of the usual well known type.

From the foregoing it will be readily apparent that a transformer unit constructed in accordance with the present invention will be effectively shielded against the action of moisture and also its design is such that it can be housed in a casing where it will be readily accessible and the terminals can be easily gotten to by a mechanic for testing. Thus, there is avoided the danger of damaging the coil or wires in attempting to get at them for making tests, which is present in the present systems where, as previously stated, the coils have to be dug up from the ground and dug out from an encasing insulating substance.

I claim:

1. An electrical unit of the character described comprising a shell having two end walls one of which constitutes a closure, a transformer unit comprising a core and coil windings, a pair of insulation bodies having said core and coil disposed therebetween and secured thereto, each of said insulation bodies carrying a pair of rigid terminals which are electrically connected with the coils of the transformer, said terminals being extended through apertures in the said opposite end walls of the shell, an insulating collar encircling each terminal and extending through the adjacent end wall to space the terminal from the wall, means secured to each terminal and bearing against the collar whereby the transformer and insulating bodies are rigidly suspended by the terminals within and free from contact with the shell, said insulating collars being threadably secured to the shell walls through which they extend, and freely turnable about the terminals therein.

2. In a unit of the character described, a shell having two end walls each provided with a pair of threaded apertures, a transformer suspended within the shell and including a pair of terminals at each end, each of said pair of terminals passing through the threaded apertures in an adjacent end wall, said casing having a plugged opening through which a fluid insulation material may be introduced, an insulating material filling said casing and enclosing the transformer, a sleeve encircling each terminal and extending through the adjacent wall opening, a threaded collar encircling each sleeve and in threaded engagement with the edge of the adjacent opening, each of said collars having a head bearing against the exterior surface of the adjacent end wall, and securing elements threaded onto said terminals and bearing against the heads of the adjacent collars.

3. In a transformer structure of the character described, including a shell having two opposite walls each provided with a pair of apertures, a transformer unit in the shell comprising a core and windings thereon, a pair of insulation blocks having the unit therebetween and in spaced relation with said shell, said core having said insulation blocks secured thereto and extending from opposite sides thereof; mounting means for said unit in the shell comprising a pair of terminal posts fixed in each block and electrically coupled with a winding, each of said posts extending from the adjacent block through a wall aperture, each of said apertures being threaded, an insulation sleeve surrounding each post, a threaded sleeve snugly receiving each insulation sleeve and in threaded engagement wtih the threads of the aperture and having a head abutting the outside of the adjacent wall, and a securing nut threaded onto each post toward the adjacent sleeve head to hold the post against longitudinal movement.

4. In a transformer structure consisting of a casing shell having two opposite end walls, a transformer unit in said shell, a pair of bodies of insulation having the transformer unit secured therebetween and each having two terminal posts rigid therewith and extending therefrom away from the adjacent unit for extension through apertures in an adjacent end wall; means for securing said unit and insulation bodies between said walls consisting of insulation sleeves encircling said terminal posts and bearing at their inner ends against the insulation bodies and extending therefrom through the adjacent shell wall, said terminal posts being screw threaded for engagement by wire securing binding nuts, and an exteriorly threaded insulation sleeve adapted for insertion through each end wall aperture in encircling relation with the first mentioned insulation sleeve, each of said second mentioned sleeves having threaded engagement with the edge of the aperture through which it extends and having an enlarged head upon its outer end for engagement with the outer side of the adjacent end wall, the said wire binding nuts when engaging the terminal posts bearing against said heads to retain the terminal posts firmly in the insulation sleeves and maintain the transformer unit suspended between said end walls.

VICTOR A. LA FAVE.